United States Patent
Bagchi et al.

(10) Patent No.: US 9,836,713 B2
(45) Date of Patent: Dec. 5, 2017

(54) DATA QUALITY MANAGEMENT USING BUSINESS PROCESS MODELING

(71) Applicant: International Business Machines Corporation, Armonk, NY (US)

(72) Inventors: Sugato Bagchi, White Plains, NY (US); Xue Bai, Storrs, CT (US); Jayant Kalagnanam, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/255,685

(22) Filed: Sep. 2, 2016

(65) Prior Publication Data

US 2016/0371612 A1 Dec. 22, 2016

Related U.S. Application Data

(63) Continuation of application No. 12/058,044, filed on Mar. 28, 2008, now abandoned, which is a
(Continued)

(51) Int. Cl.
*G06Q 10/00* (2012.01)
*G06Q 10/06* (2012.01)
(Continued)

(52) U.S. Cl.
CPC ........... *G06Q 10/067* (2013.01); *G06F 17/18* (2013.01); *G06F 17/30303* (2013.01);
(Continued)

(58) Field of Classification Search
CPC ................ G06Q 10/06; G06Q 10/067; G06Q 10/06311; G06Q 10/06375; G06Q 10/06395; G06F 17/18; G06F 17/30303
(Continued)

(56) References Cited

U.S. PATENT DOCUMENTS 5,842,202 A * 11/1998 Kon .................... G06F 11/0727
2003/0065541 A1* 4/2003 Menninger ............ G06Q 10/06
705/7.11
(Continued)

OTHER PUBLICATIONS

Harte-Hanks Trillium Software redefines how Data Quality is delivered within enterprises; First to ship data quality via Web Services interface customised for IBM WebSphere and BEA WebLogic and first to offer universal connectivity for data quality M2 Presswire Jun. 22, 2004: NA. 5pgs.*
(Continued)

*Primary Examiner* — Timothy Padot
(74) *Attorney, Agent, or Firm* — Whitam, Curtis & Cook, P.C.; Daniel P Morris (57) ABSTRACT

A business process modeling framework is used for data quality analysis. The modeling framework represents the sources of transactions entering the information processing system, the various tasks within the process that manipulate or transform these transactions, and the data repositories in which the transactions are stored or aggregated. A subset of these tasks is associated as the potential error introduction sources, and the rate and magnitude of various error classes at each such task are probabilistically modeled. This model can be used to predict how changes in transactions volumes and business processes impact data quality at the aggregate level in the data repositories. The model can also account for the presence of error correcting controls and assess how the placement and effectiveness of these controls alter the propagation and aggregation of errors. Optimization techniques are used for the placement of error correcting controls that meet target quality requirements while minimizing the cost of operating these controls. This analysis also contributes to the development of business "dashboards" that allow decision-makers to monitor and react to key performance indicators (KPIs) based on aggregation of the
(Continued)

transactions being processed. Data quality estimation in real time provides the accuracy of these KPIs (in terms of the probability that a KPI is above or below a given value), which may condition the action undertaken by the decision-maker.

5 Claims, 3 Drawing Sheets

Related U.S. Application Data continuation of application No. 11/357,134, filed on Feb. 21, 2006, now abandoned.

(51) Int. Cl.
      *G06F 17/30*       (2006.01)
      *G06F 17/18*       (2006.01)

(52) U.S. Cl.
    CPC ....... *G06Q 10/06* (2013.01); *G06Q 10/06311* (2013.01); *G06Q 10/06375* (2013.01); *G06Q 10/06395* (2013.01)

(58) Field of Classification Search
    USPC .............................................. 705/7.37, 7.41
    See application file for complete search history.

(56) References Cited

U.S. PATENT DOCUMENTS

| | | | |
|---|---|---|---|
| 2003/0233249 A1* | 12/2003 | Walsh ................. | G06Q 10/063 709/203 |
| 2004/0015381 A1* | 1/2004 | Johnson .............. | G06Q 10/063 705/7.37 |
| 2006/0161814 A1* | 7/2006 | Wocke ................ | G06K 9/6251 714/26 |

OTHER PUBLICATIONS

Vality Enhances IBM DB2 Warehouse Manager. Worldwide Databases 13.9 (Sep. 1, 2001): 1.*
E. Pierce; "Assessing Data Quality with Control Matrices"; Communications of the ACM, Feb. 2004, vol. 47, No. 2, pp. 82-86.
Journal of Accounting Literature; The Accounting Research Center University of Florida, vol. 2, Spring 1983, pp. 203-219.
Lea et al.; "Modeling of the Audit Risk Assessment Process at the Assertion Level Within an Account Balance"; Journal of Practice & Theory, vol. 11, supplement 1992, pp. 152-159.
B. Cushing; "A Mathematical Approach to the Analysis and Design of Internal Control Systems"; The Accounting Review, vol. 49, No. 1, Jan. 1974, pp. 24-41.
S. Hamlen; "A Chance-Constrained Mixed Integer Programming Model for Internal Control Design"; The Accounting Review, vol. 55, No. 4, Oct. 1980, pp. 578-593.
Nado et al.; "Comet: An Application of Model-Based Reasoning to Accounting Systems"; Proceedings of the Eighth Innovative Applications of Artificial Intelligence Conference, American Association for Artificial Intelligence, 1996, pp. 1483-1490.
Wand et al.; "Anchoring Data Quality Dimensions in Ontological Foundations"; Communications of the ACM, vol. 39, No. 11, Nov. 1996, pp. 87-95.
R. Wang; "A Product Perspective on Total Data Quality Management"; Communications of the ACM, vol. 41, No. 2, Feb. 1998, pp. 58-65.
Pipino et al; "Data Quality Assessment"; Communications of the ACM, vol. 45, No. 4, Apr. 2002, pp. 211-218.
H. Xu; "Managing Accounting Information Quality: An Australian Study"; ICIS 2000—Proceedings of the twenty first International conference on Information systems, pp. 628-634.
Strong et al; "Data Quality in Context"; Communications of the ACM, vol. 40, No. 5, May 1997, pp. 103-110.
Cappiello et al.; "Data Quality Assessment from the User's Perspective"; IQIS 2004—Proceedings of the 2004 International workshop on Information quality in information systems, pp. 68-73.

* cited by examiner

DATA QUALITY MANAGEMENT USING BUSINESS PROCESS MODELING

BACKGROUND OF THE INVENTION

Field of the Invention

The present application generally relates to modeling and quantitative analysis techniques for managing the quality of data and, more particularly, to extending a business process model with constructs to identify the sources data whose quality is of interest, the data transformative tasks where error may be introduced, the error detection and correction controls in the process, and the data repositories whose quality is to be assessed.

BACKGROUND DESCRIPTION

As companies increasingly adopt information systems that cover a range of functional areas, they have electronic access to vast amounts of transactional data. Increasingly companies are looking to develop dashboards where a variety of key performance indicators that are composed from the transactional data are displayed to assist in business decisions. The quality of data contained in these enterprise information systems has important consequences, both from the internal perspective of making business decisions based on the data as well as the legal obligation to provide accurate reporting to external agencies and stakeholders. As a result, companies spend considerable time and money to assess and improve the quality of data in the transactions that flow through its information systems and are stored in its repositories.

A considerable body of literature exists on the issue of data quality assessment from the perspective of auditing a given information processing system. The prior work on data quality management comes from the fields of financial accounting and auditing and information systems.

Data quality and control assessment has been studied in accounting literature since the early 1970s. Most of the studies have approached reliability assessment with the accounting system viewed as a "black box" that transforms data into aggregations of account balances contained in various ledgers (see, for example, W. R. Knechel, "The use of Quantitative Models in the Review and Evaluation of Internal Control: A Survey and Review", *Journal of Accounting Literature*, (Vol. 2), Spring 1983:205-219). This approach works well from the perspective of an auditor who is interested in assessing the reliability with which the black box performs the data transformations. We review this literature to make note of the key concepts, definitions, and analyses that we adopt and extend in order to develop data quality modeling and analysis techniques at the detailed level of the transformational tasks and processes that are contained within the accounting system.

B. E. Cushing in "A Mathematic Approach of the Analysis and Design of Internal Control Systems" in *The Accounting Review* 1974, pp. 24-41, developed a mathematic formulation for measuring the reliability for an accounting system. He used the probability that the system makes no errors of any kind in its outputs as the system reliability measure. He also derived a cost measurement by taking into consideration of the cost of executing error correction controls and the risk of undetected errors in the system. It is useful in the sense of evaluating the reliability assessment of a given system. However, Cushing's control model takes the system structure as given; it does not address any problem from the system design perspective. We apply the same basic concepts of reliability and cost measurement to the problems of evaluating system reliability for a detailed process model and to design the optimal set of corrective controls with the objective of cost minimization.

S. S. Hamlen in "A Chance-Constrained Mix Integer Programming Model for Internal Control Systems", *The Accounting Review* 1980, pp. 578-593, proposed a mixed integer programming model for designing an internal control system. Her model minimizes the cost of controls subject to a given percentage of quality improvement desired in the output from the system. In order to formulate a linear program, the model imposes instrumental polynomial terms with their respective constraints which have the drawback of growing exponentially with the number of terms. The accounting system is modeled as a set of controls that can correct a set of error types (which could be errors in various ledgers). We extend Hamlen's approach to a more detailed model that identifies error sources within the business process of the accounting system and controls that may be selectively applied to these error sources. Our model also allows us to assess the effect of applying a control to an error source on the resulting probability of errors at all the ledgers that are linked to that error source. This leads to greater flexibility in selecting controls to apply with the potential of better solutions. We also show how our optimization problem formulation, though more detailed than Hamlen's, can be reduced to a non-exponential series of knapsack problems without having to convert a non-linear system into a linear one.

Other research in accounting literature focused on probabilistic modeling and quantitative assessment of accounting information system reliability. These studies have focused at the accounting system level modeling of reliability assessment using probabilistic or deterministic methods. They treat the transactions streams and transformative processes within the accounting information systems as a black box. Recent studies have begun to develop more detailed models for the assessment of accounting system reliability.

R. B. Lea, S. J. Adams, and R. F. Boykin in "Modeling of the audit risk assessment process at the assertion level within an account balance", *Auditing: A Journal of Practice & Theory* 1992 (Vol.11, Supplement):152-179, discussed the audit risk assessment models at different levels of detail within accounting systems. They model how risks of error at the level of the various transaction streams are related to the risk of error at the account balance level to which they contribute. They note that the level of tolerable error at the transaction stream level cannot be assumed to be the same as that for the account balance level. Their risk model covers both inherent risk (in the absence of internal controls) and control risk. We follow their motivation to decompose an account balance to its constituent transaction streams but extend their purely additive model to include (a) the volume of transactions in the various streams and (b) the probabilistic network structure of these transaction streams, identifying the various sources of errors (as represented by a process model). This allows us to overcome the assumption made by their model that the errors in the various transaction streams are independent.

R. Nado, M. Chams, J. Delisio, and W. Hamscher in "Comet: An Application of Model-Based Reasoning to Accounting Systems", *Proceedings of the Eighth Innovative Applications of Artificial Intelligence Conference* AAAI Press (1996) pp. 1482-1490, developed a process model based reasoning system, which they called "Comet", for analyzing the effectiveness of controls. This is one of the earliest attempts to decompose the accounting system structure into the level of tasks that process transactions and implement internal controls. They modeled accounting systems as a hierarchically structured graph with nodes representing the transaction processing activities and collection points. The potential for failure in each activity is propagated to the collection points that are the accounts being audited. Controls are modeled in terms of the probability that they will not cover the failures. This model can be used to select the key set of controls that reduce the risk of failure below a threshold. However, the paper does not clarify the quantitative model (if any) that is used. It models only the probability of failures but ignores the magnitude of error in these failures. It also implicitly assumes identical and fixed costs for all controls. Our model adopts the basic process modeling concepts introduced in this paper and extends them to develop the quantitative framework described hereinafter. This enables the performance of rigorous quantitative analysis including Monte Carlo simulation of inherent and control risk and optimization of control usage based on risk and cost.

Research on data quality in the information systems literature has focused on identifying the important characteristics that define the quality of data (see, for example, Y. Wand and R. Y. Wang, "Anchoring data quality dimensions in ontological foundations", *Communications of the ACM* (39:11) (1996), pp. 86-95, and R. Y. Wang, "A Product Prospective on Total Data Quality Management", *Communications of the ACM*, (41:2) (1998), pp. 58-65). Recently, the management of data quality and the quality of associated data management processes has been identified as a critical issue (see D. Ballou, R. Wang, H. Pazer, and G. Tayi, "Modeling Information Manufacturing Systems to Determine Information Product Quality", *Management Science* (44:4), April 1998, pp. 462-484). However, most of the papers describe the criteria for the information systems design to improve or achieve good data quality (DQ) or information quality (IQ). To our knowledge, none of the papers have tackled data quality management from the point of view quantitative reliability assessment and optimization, nor did they bring the costs of quality and quality improvement into the DQ or IQ assessment consideration. We consider these issues to be critical from the practical perspective of design and management of enterprise information systems.

Wand and Wang, supra, are amongst the first who studied the data quality in the context of information systems design. They suggested rigorous definitions of data quality dimensions by anchoring them in ontological foundations and showed that such dimensions can provide guidance to systems designers on data quality issues. They developed a set of Ontological Concepts, and defined Design Deficiencies and Data Quality Dimensions. Then they presented the analysis of Dimensions and the Implications to Information Systems Design. Wang, supra, and Ballou et al., supra, developed the Total Data Quality Management methodology (TDQM). TDQM consists of the concepts and the principles of information quality (IQ) and the information product (IP), and procedures of information management system (IMS) for defining, measuring, analyzing, and improving information products.

L. L. Pipino, Y. W. Lee, and R. Y. Wang, in "Data Quality Assessment", *Communications of the ACM*, (45:4), (2002), pp. 211-218, introduced three functional forms of data quality: simple ratio, min or max operators, and weighted average. Based on these functional forms, they developed the illustrative metrics for important data quality dimensions. Finally, they presented an approach that combines the subjective and objective assessments of data quality, and demonstrated how the approach can be used effectively in practice.

H. Xu in "Managing accounting information quality: an Australian study", *Managing Accounting Information Quality*, (2000), pp. 628-634, developed and tested a model that identifies the critical success factors (CSF) influencing data quality in accounting information systems. He first proposed a list of factors influencing the data quality of AIS from the literature, and then conducted pilot case studies, using the findings from the pilot study together with the literature to identify possible critical success factors for data quality of accounting information systems. He did case studies of accounting information quality in Australian organizations in practice to test and customize the initial research model and compared similarities and differences between proposed critical success factors with real-world critical success factors.

E. M. Pierce in "Assessing Data Quality with Control Matrices", *Communications of the ACM*, (47:2), (2004), pp. 82-86, developed a technique for information quality management based on the practice from auditing field: an information product control matrix, to evaluate the reliability of an information product. Pierce defined the components of the matrix, and presented a way to link the data problems to the quality controls that should detect and correct these data problems during the information manufacturing process.

D. Strong, Y. W. Lee, and R. Wang in "Data Quality in Context", *Communications of the ACM*, (40:5), (1997), pp. 58-65, propose a data-consumer perspective for data assessments as opposed to the traditional intrinsic DQ assessment. They presented a set of DQ dimensions that consists of not only the Intrinsic DQ, but Accessibility DQ, Contextual DQ and Representational DQ. The latter three concern about the user-task context. They argued that data quality assessment should incorporate the task context of users and the processes by which users' access and manipulate data to meet their task requirements.

Adopted from Strong et al.'s idea, C. Cappiello, C. Francalanci, and B. Pernici in "Data quality assessment from the user's perspective", *International Workshop on Information Quality in Information Systems.*, 2004, proposed a data quality assessment model that takes into consideration user requirements in the assessment phase. In their mathematical formulation, parameters and matrices to capture the user and user class's preference and requirement are introduced. Their model showed how data quality assessment should take into account how user requirements vary with the accessed service.

SUMMARY OF THE INVENTION

Our invention addresses the issue of data quality management from the perspectives of the owner or the consumer of the information processing system and predicting and managing the quality of its data when faced with anticipated changes in the business environment in which the system operates. Such changes could include:

Changes in the relative volume of transactions arriving from different input sources. For example, a small but fast-growing business unit alters the mix of sales transactions over time and therefore impacts the overall quality of sales data.

Changes in the business processes and policies that transform the data in the transactions. For example, automated systems replace manual tasks or sections of a process are outsourced.

Changes in the business controls that attempt to detect and fix errors in the transaction. For example, the thresholds that trigger a control are altered or controls are added or removed as part of process re-engineering.

This invention provides the modeling and analysis for predicting how these changes impact data quality. Then, on the basis of this predictive ability, optimization techniques are used for the placement of error correcting controls that meet target quality requirements while minimizing the cost of operating these controls. This analysis also contributes to the development of business "dashboards" that allow decision-makers to monitor and react to key performance indicators (KPIs) based on aggregation of the transactions being processed. Data quality estimation in real time provides the accuracy of these KPIs (in terms of the probability that a KPI is above or below a given value), which may condition the action undertaken by the decision-maker.

Our approach to modeling data quality takes advantage of the increasing emphasis in many businesses on the formal modeling of business processes and their underlying information processing systems. Although the initial objective of process modeling is usually for resource planning, and services and workflow design purposes, data quality estimation can be an important secondary outcome.

A business process model can be used to represent the sources of transactions entering the information processing system and the various tasks within the process that manipulate or transform these transactions. We associate a subset of these tasks as the potential error introduction sources and probabilistically model the rate and magnitude of various error classes at each such task. We also define the information repositories such as accounting ledgers and other databases where the transactions are eventually stored and whose quality needs to be assessed. A network of links (often with probabilistic branches) connects the transaction sources, error sources, and the information repositories.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Process Model

A business process model represents the flow of physical items or informational artifacts through a sequence of tasks and sub-processes that operate on them. The flow may be controlled by different types of "gateways" that can diverge or converge flows using constructs such as branches, forks, merges, and joins. These elements form a directed graph with the tasks and gateways as nodes. The graphs may be cyclic (with the probability of a cycle being less than one) as well as hierarchical, where one of the nodes could be a sub-process containing its own directed graph.

We extend the business process modeling framework by adding the following attributes relevant to modeling data quality. Consider a business process with T tasks, including all the tasks in its sub-processes. We assign some of these tasks to be transaction sources, error sources, and audit targets as defined next.

A start event or initial task in a process may be assigned to be a transaction source. This is the origination point of a transaction in which an error is yet to be introduced. A transaction source is characterized by a volume of transaction over a predefined time period and a random variable signifying the quantitative value of the transaction. For financial accounting data, this is typically the book value of the transaction.

Let $T_S \subset T$ be the set of transaction sources in the process model.

Let $x_k$ be a random variable representing the book value a transaction originating from the transaction source $t_k \in T_s$.

Errors could occur when data originating from a transaction source passes through a subsequent task that is assigned to be an error source. Error sources are tasks that operate on the incoming transaction and could introduce errors in them.

Let $T_E \subset T$ be the set of error sources in the process model.

Let $p_i(\epsilon)$ be the error incidence probability for error class $\epsilon$ in the error source $t_i \in T_E$.

Borrowing from financial accounting practice, we consider three classes of error:

1. Valuation error, which is defined as an error in the magnitude or value of a valid transaction. This can happen when a transaction's book value contains the wrong number due to data entry or mathematical calculation error.

Substituting $\epsilon = v$, let $p_i(v)$ be the probability that a valuation error is introduced at the error source $t_i$.

Let $z_i$ be a random variable representing the taint of the valuation error. "Taint" is defined as the ratio of the error magnitude to the book value. If a valuation error is introduced at the error source $t_i$, the magnitude of that error in the book value is defined as:

$$e_i^v = z_i x_i, \quad (1)$$

where $x_i$ is the observable book value of a transaction at error source $t_i$ and $e_i^v$ is the random discrepancy between this book value and the true value of the transaction, known as its audit value.

2. Existence error is defined as the introduction of spurious transaction entries at the error source. This can happen if the task at the error source erroneously introduces a new or duplicate transaction into the business process or fails to follow a business rule that calls for the cancellation or rejection of a real transaction.

Substituting $\epsilon = e$, let $p_i(e)$ be the probability that an existence error is introduced at the error source $t_i$.

Let $x_i^e$ be the random variable for the book value of the spurious transaction.

If an existence error is introduced at the error source i, the magnitude of that error in the book value is defined as:

$$e_i^e = x_i^e. \quad (2)$$

3. Completeness error occurs when a valid transaction is lost or goes missing at the error source. This can happen for example when a valid transaction is erroneously deleted or canceled or if there is a failure to create a new data record as required by a business rule at the task.

Substituting $\epsilon = c$, let $p_i(c)$ be the probability that a completeness error is introduced at the error source $t_i$.

If a completeness error is introduced at the error source i, the magnitude of that error in the book value is defined as:

$$e_i^c = x_i. \quad (3)$$

From the above definitions of the three error classes, note that an error source can introduce only one class of error in any single transaction.

Audit targets are repositories in the business process where transactions can be stored and retrieved. These could be databases containing business and financial data that is used by the company in its decision-making and evaluation of its strategy, or used to generate quarterly and annual financial reports to external parties such as shareholders and regulatory agencies.

Let $T_A \subset T$ be the set of audit targets in the process model (where we model repositories as tasks).

Let $X_j$ be the set of transactions in an audit target $t_j \epsilon T_A$ and $X_j^\epsilon$ be the subset of transactions containing error of class $\epsilon$.

Let $x_j$ be the book value of a transaction in $X_j$ and $e_j^\epsilon$ be the magnitude of an erroneous transaction in $X_j^\epsilon$.

As described in more detail below, we consider three mutually exclusive classes of error: valuation, existence, and completeness, denoted by the set [v, e, c]. Let $E_j \subseteq [v, e, c]$ be the subset of error classes of interest in the audit target.

Our objective of data quality assessment is to quantify the error in these repositories according to various error metrics.

1. Rate One: Error Incidence, is the ratio of the number of erroneous transactions of error class $\epsilon$ to the total number of transactions:

$$R1_j^\epsilon = \frac{|X_j^\epsilon|}{|X_j|}. \quad (4)$$

2. Rate Two: Proportion of net monetary error, is the ratio of total monetary error over all erroneous transactions of error class $\epsilon$ to the total book value over all transactions:

$$R2_j^\epsilon = \frac{\sum_{X_j^\epsilon} e_j^\epsilon}{\sum_{X_j} x_j}. \quad (5)$$

The proportion of net monetary error can be decomposed into the two following rates:

3. Rate Three: Proportion of dollar unit in error or tainting, is the ratio of the total monetary error over all erroneous transactions of error class $\epsilon$ to the total book value over the same set of erroneous transactions:

$$R3_j^\epsilon = \frac{\sum_{X_j^\epsilon} e_j^\epsilon}{\sum_{X_j^\epsilon} x_j}. \quad (6)$$

4. Rate Four: Proportion of dollar units containing error, is the ratio of the total book value of all erroneous transactions of error class $\epsilon$ to the total book value over all the transactions:

$$R4_j^\epsilon = \frac{\sum_{X_j^\epsilon} x_j}{\sum_{X_j} x_j}. \quad (7)$$

The transactions sources, error sources and audit targets are connected to each other by a network of links and gateways. Gateways are defined as the means by which (a) the output from a single task diverges into the inputs of multiple tasks or (b) the outputs from multiple tasks converge into the input of a single task. The following types of gateways are common in a process network:

1. Branch: The branch gateway sends the output of a single task to the input of one out of multiple alternative tasks. The branching decision is probabilistic (either directly specified or derived from other branching criteria).
2. Merge: The merge gateway allows the output of multiple tasks to feed into the input of a single task which is performed when it receives an input from any one of the tasks being merged.
3. Fork: The fork gateway sends the output of a single task to the inputs of multiple tasks at the same time, resulting in the creation of parallel streams of task activity.
4. Join: The join gateway allows the output of multiple tasks to feed into the input of a single task which is performed only when it receives input from all of the tasks being joined. This is usually present to synchronize the parallel task activities created as a result of a fork upstream in the process network.

We can traverse a process network with the objective of identifying the following parameters that link transaction sources to error sources, and error sources to audit targets:

Let $V_{ki}$ be the volume of transactions that flow from a transaction source $t_k$ to a task $t_i$ designated as an error source.

Let $P_{ij}$ be the probability that a transaction that flows through an error source $t_i$, will subsequently be stored in an audit target repository $t_j$.

Figure 1:
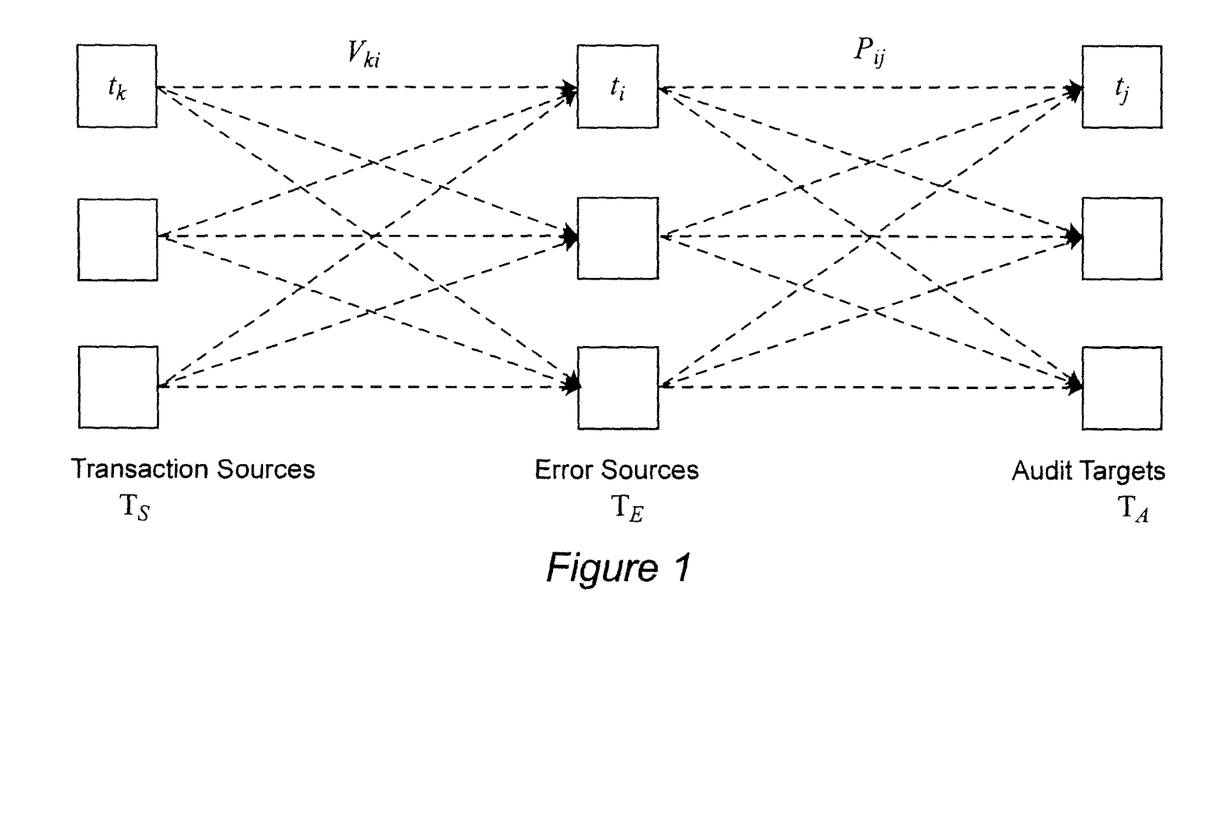
FIG. 1 is a block diagram of a process network consisting of transaction sources, error sources and audit targets.

FIG. 1 shows a network diagram linking the transaction sources, error sources, and audit targets. The dashed links between any two nodes denote a (possibly null) set of tasks and gateways (hidden in the figure) that intermediate the flow of transactions between the two nodes in the direction shown. By definition, these hidden tasks cannot be transaction sources, error sources, or audit targets.

As shown by the figure, an error introduced at an error source may be stored in several audit targets. Also, a single audit target may contain errors introduced at multiple error sources. With the data quality attributes defined above and the network interconnections depicted in FIG. 1, the propagation of transactions and their errors can now be calculated. The volume of transactions, $V_i$, reaching error source $t_i \epsilon T_E$ from all transactions sources $t_k \epsilon . T_S$:

$$V_i = \sum_{t_k \in T_S} V_{ki}. \quad (8)$$

The book value, $x_i$, of a transaction reaching error source, $t_i$:

$$x_i = \frac{\sum_{t_k \in T_S} x_k \cdot v_{ki}}{V_i}. \quad (9)$$

The magnitude of error, $e_i^\varepsilon$, of error class introduced by error source $t_i$ is given by Equations (1), (2) and (3) for valuation, existence and completeness errors respectively.

The transactions passing through error sources propagate to audit targets based on the probability $P_{ij}$ which is determined from the process network. The aggregation of all transactions from all error sources results in $X_j$ defined above, the set of transactions in an audit target, $t_j \in T_A$. The subset of these transactions containing errors depends on the error incidence probability $p_i(e)$ for each error source and the volume of transactions flowing through it.

At each audit target, $t_j \in T_A$, we calculate the set of error rates defined above, corresponding to each of the error classes. Let $\varepsilon \in [v, e, c]$ denote the class of error for which we calculate the error rates.

$$R1_j^\varepsilon = \frac{|X_j^\varepsilon|}{|X_j|} = \frac{\sum_{t_i \in T_E} V_i \cdot p_i(\varepsilon) \cdot P_{ij}}{\sum_{t_i \in T_E} V_i \cdot P_{ij}}, \quad (10)$$

$$R2_j^\varepsilon = \frac{\sum_{X_j^\varepsilon} e_j^\varepsilon}{\sum_{X_j} x_j} = \frac{\sum_{t_i \in T_E} V_i \cdot e_i^\varepsilon \cdot p_i(\varepsilon) \cdot P_{ij}}{\sum_{t_i \in T_E} V_i \cdot x_i \cdot P_{ij}}, \quad (11)$$

$$R3_j^\varepsilon = \frac{\sum_{X_j^\varepsilon} e_j^\varepsilon}{\sum_{X_j^\varepsilon} x_j} = \frac{\sum_{t_i \in T_E} V_i \cdot e_i^\varepsilon \cdot p_i(\varepsilon) \cdot P_{ij}}{\sum_{t_i \in T_E} V_i \cdot x_i \cdot p_i(\varepsilon) \cdot P_{ij}}, \quad (12)$$

$$R4_j^\varepsilon = \frac{\sum_{X_j^\varepsilon} x_j}{\sum_{X_j} x_j} = \frac{\sum_{t_i \in T_E} V_i \cdot x_i \cdot p_i(\varepsilon) \cdot P_{ij}}{\sum_{t_i \in T_E} V_i \cdot x_i \cdot P_{ij}}. \quad (13)$$

These equations calculate error rates for a single error class. As described above, an error source may introduce up to three classes of errors: valuation, existence, or completeness. For a given transaction however, only a single class of error is possible. Due to this mutual exclusion, the sets of erroneous transactions, $X_j^v$, $X_j^e$, $X_j^c$, have no transactions in common (i.e., their pair-wise intersections result in null sets). As a result of this property, the combined error rates for all error classes are:

$$R1_j = \sum_{\varepsilon \in E_j} R1_j^\varepsilon = \frac{\sum_{\varepsilon \in E_j} \sum_{t_i \in T_E} V_i \cdot p_i(\varepsilon) \cdot P_{ij}}{\sum_{t_i \in T_E} V_i \cdot P_{ij}} = \frac{\sum_{t_i \in T_E} \left(V_i \cdot P_{ij} \sum_{\varepsilon \in E_j} p_i(\varepsilon)\right)}{\sum_{t_i \in T_E} V_i \cdot P_{ij}} \quad (14)$$

$$R2_j = \quad (15)$$

$$\sum_{\varepsilon \in E_j} R2_j^\varepsilon = \frac{\sum_{\varepsilon \in E_j} \sum_{t_i \in T_E} V_i \cdot e_i^\varepsilon \cdot p_i(\varepsilon) \cdot P_{ij}}{\sum_{t_i \in T_E} V_i \cdot x_i \cdot P_{ij}} = \frac{\sum_{t_i \in T_E} \left(V_i \cdot P_{ij} \sum_{\varepsilon \in E_j} e_i^\varepsilon \cdot p_i(\varepsilon)\right)}{\sum_{t_i \in T_E} V_i \cdot x_i \cdot P_{ij}}$$

where the set $E_j \subseteq [v, e, c]$ consists of the error classes of interest at the audit target.

These metrics can be directly calculated if point estimates (or means only) are given for the input random variables (such as the transaction book values $x_k$ and the taints $z_i$). If instead, probability distributions are specified for the random variables, Monte Carlo simulation can be done to arrive at probability distributions for the outputs.

Cost of error arises from the failure of reduce or correct errors that accumulate at the audit targets of a transaction process. The cost may arise due to the additional cost or losses incurred because of operating the business with incorrect information (for example poor targeting of potential customers due to erroneous sales data). The cost could also be in the form of penalties assessed by regulatory and legal agencies due to misstatements made as a result of incorrect data in financial ledgers.

Let $\omega_1$ be the unit cost per erroneous transaction.

Let $\omega_2$ be the unit cost per unit of monetary error.

Then, the total cost due to the number of erroneous transactions for audit target $t_j$ can be obtained as follows, applying Equation (14):

$$\Omega_{1,j} = R1_j \cdot \omega_1 \cdot |X_j| \quad (16)$$

$$= \omega_1 \cdot \sum_{t_i \in T_E} \left(V_i \cdot P_{ij} \sum_{\varepsilon \in E_j} p_i(\varepsilon)\right)$$

The total cost due to the magnitude of monetary error for audit target $t_j$ can be obtained as follows, applying Equation (15):

$$\Omega_{2,j} = R2_j \cdot \omega_2 \cdot \sum_{x_j} x_j \quad (17)$$

$$= \omega_2 \cdot \sum_{t_i \in T_E} \left(V_i \cdot P_{ij} \sum_{\varepsilon \in E_j} e_i^\varepsilon \cdot p_i(\varepsilon)\right)$$

The total cost across all audit targets $t_j \in T_A$ is:

$$\Omega = \sum_{t_j \in T_A} (\Omega_{1,j} + \Omega_{2,j}). \quad (18)$$

The set of equations introduced in this section enables the assessment of data quality at an audit target both in terms of error rates and cost. This assessment takes into account the structure of the business process and the location of transaction sources and error sources within it. Process owners can use this assessment to quantify the impact of changes in process structure or transaction volumes on the quality of data being stored. In auditing terminology, this level of analysis estimates the inherent risk of the accounting system. In the next section, we begin to estimate the effect of applying error detection and correction controls in order to reduce error rates and costs.

Control Model

Businesses implement internal control systems to reduce the incidence of errors in its business processes. Controls may be implemented either to prevent errors from being introduced or to monitor for and detect errors after they have been generated at error sources. In the latter case, the control could attempt to correct the errors as they are detected (feed-forward control) or to report them so that the error-producing action may be eventually corrected (feedback control) (see B. E. Cushing, "A Further Note on the Mathematic Approach to Internal Control", *The Accounting Review*, Vol. 50, No. 1, 1975, pp. 141-154).

Figure 2A:
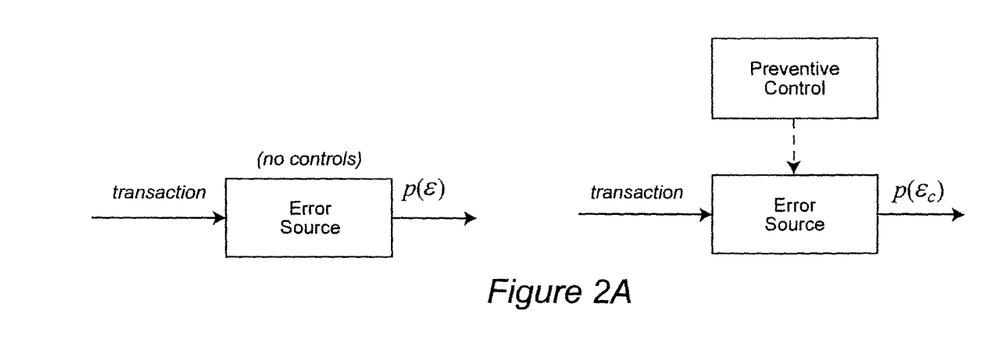
FIG. 2A is a block diagram illustrating preventive controls on an error source.
Figure 2B:
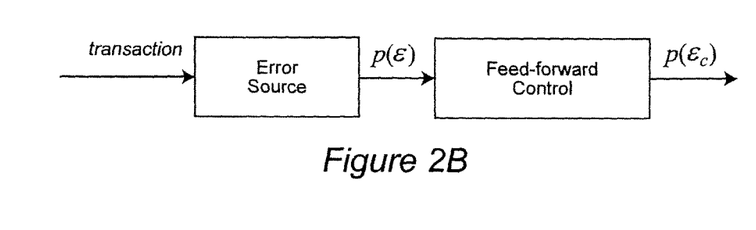
FIG. 2B is a block diagram illustrating feed-forward control on an error source.

For our model, we consider the controls that have a direct impact on reducing the number of erroneous transactions introduced at an error source. This includes preventive and feed-forward controls but excludes feedback controls because they lack the direct corrective action on erroneous transactions. FIGS. 2A and 2B show how these control types interact with an error source and alter its probability of introducing an error from $p(\epsilon)$ to $p(\epsilon_c)$. More particularly, FIG. 2A shows the impact of preventive control on an error source, and FIG. 2B shows the impact of feed-forward control on an error source. Note that the controls may only impact the probability of an error, not its taint.

Figure 3:
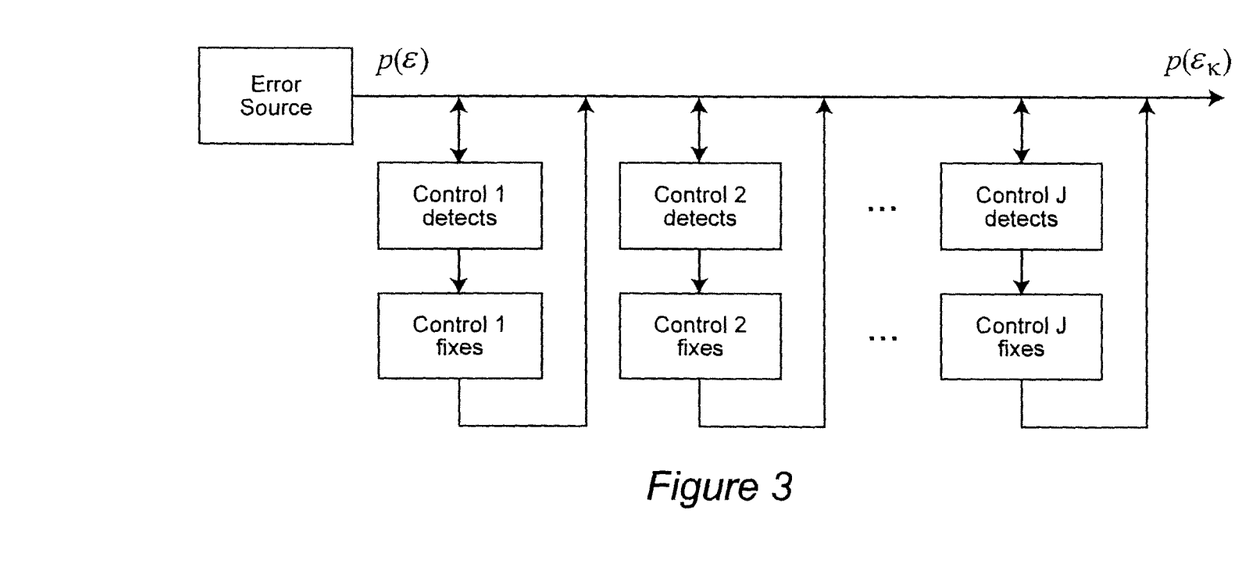
FIG. 3 is a block diagram illustrating a sequence of feed-forward controls at an error source.

An error source may have a sequence of feed-forward controls associated with it to monitor, detect, and fix errors that may be introduced by the error source or by any of the intervening controls. This is shown in FIG. 3. The figure also depicts the possibility that not all the transactions that leave an error source may be sent to a control. A random sampling or a business rule may be used to select the subset of transactions that are sent to each control.

To develop the mathematical formula for calculating, $p(\epsilon_K)$, the probability of error after a sequence of controls K is applied, let us consider the simplest case of one error source and one feed-forward control. There are four variables in the system to describe the state of this control system:

the error status $E=(\epsilon, \bar{\epsilon})$,
the control signaling status $C_s=(c_s, \bar{c}_s)$,
the control fixing status $C_f=(c_f, \bar{c}_f)$, and
the error status after the application of the control, $E_c=(\epsilon, \bar{\epsilon})$.

There are eight possible states in the control system as described in the table below, along with the resulting impact on the error status $E_c$ after the application of the control:

TABLE 1

Control System States

| State | E | $C_s$ | $C_f$ | Description | $E_c$ |
|---|---|---|---|---|---|
| 1 | $\epsilon$ | $c_s$ | $c_f$ | An error exists, the control signals the error, and fixes it. | $\bar{\epsilon}$ |
| 2 | $\epsilon$ | $c_s$ | $\bar{c}_f$ | An error exists, the control signals the error, and does not fix it. | $\epsilon$ |
| 3 | $\epsilon$ | $\bar{c}_s$ | $c_f$ | An error exists, the control does not signal the error, but somehow takes an action of fixing it. | $\bar{\epsilon}$ |
| 4 | $\epsilon$ | $\bar{c}_s$ | $\bar{c}_f$ | An error exists, the control does not signal the error, nor fixes it. | $\epsilon$ |
| 5 | $\bar{\epsilon}$ | $\bar{c}_s$ | $c_f$ | An error does not exist, the control does not signal the error, but somehow takes an action of error "fixing". | $\epsilon$ |
| 6 | $\bar{\epsilon}$ | $\bar{c}_s$ | $\bar{c}_f$ | An error does not exist, the control does not signal the error, nor fixes it. | $\bar{\epsilon}$ |
| 7 | $\bar{\epsilon}$ | $c_s$ | $c_f$ | An error does not exist; the control signals an error, and takes an action of error "fixing". | $\epsilon$ |
| 8 | $\bar{\epsilon}$ | $c_s$ | $\bar{c}_f$ | An error does not exist; the control signals an error, but no fixing action. | $\bar{\epsilon}$ |

We define the following exogenous attributes of a feed-forward control that represent the effectiveness of the control (we show later that preventive controls can be formulated as a special case):

$p(c_s|\epsilon)$: the probability that the control signals an error $\epsilon$ in an error source, given that the error $\epsilon$ exists.

$p(c_s|\bar{\epsilon})$: the probability that the control signals an error $\epsilon$ in an error source, given that the error $\epsilon$ does not exist (contra factual).

$p(c_f|c_s)$: the probability that the control takes an action of error fixing, given that it signals an error $\epsilon$ in an error source.

$p(c_f|\bar{c}_s)$: the probability that the control takes an action of error fixing, given that it does not signal an error $\epsilon$ in an error source (contra factual).

Figure 4:
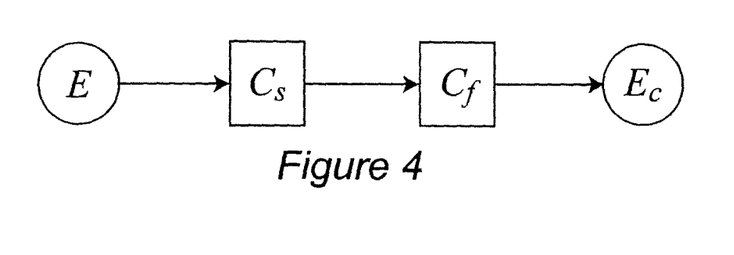
FIG. 4 is an influence diagram of a simple control system.

The influence diagram of this control system is shown in FIG. 4. The diagram shows that if the status of $C_s$ is known, then the status of $C_f$ is independent of the status of E, i.e., $C_f$ and E are conditionally independent given:

$$p(E, C_f | C_s) = p(E | C_s) \cdot p(C_f | C_s) \quad (19)$$

From this conditional independence, we have:

$$p(C_f | C_s, E) = \frac{p(E, C_f | C_s)}{p(E | C_s)} = \frac{p(E | C_s) \cdot p(C_f | C_s)}{p(E | C_s)} = p(C_f | C_s) \quad (20)$$

Using this, we derive the probability of any state in the control system as follows:

$$\begin{aligned} p(E, C_s, C_f) &= p(C_f, C_s | E) \cdot p(E) \quad (21) \\ &= p(C_f | C_s, E) \cdot p(C_s | E) \cdot p(E) \\ &= p(C_f | C_s) \cdot p(C_s | E) \cdot p(E) \end{aligned}$$

We assume the following for feed-forward controls:

If an control does not signal an error, there will never be an action of fixing an error, i.e., $p(c_f|\bar{c}_s)=0$ and $p(\bar{c}_f|\bar{c}_s)=1$.

If an control does signal an error, there will always be an action of fixing an error, i.e., $p(c_f|c_s)=1$ and $p(\bar{c}_f|c_s)=0$.

These assumptions are always true for preventive controls along with $p(c_s|\bar{\epsilon})=0$. That is, we formulate a preventive control as a special case of the feed-forward control where $p(c_s|\epsilon)$ is the only parameter that can have a value between 0 and 1. This parameter represents the effectiveness of the control in preventing an error from being generated by the error source.

Under these assumptions, Equation (21) reduces to the following for each of the eight states in the control system:

$$p(\epsilon, c_s, c_f) = p(c_s|\epsilon) \cdot p(\epsilon)$$

$$p(\epsilon, c_s, \bar{c}_f) = 0$$

$$p(\epsilon, \bar{c}_s, c_f) = 0$$

$$p(\epsilon, \bar{c}_s, \bar{c}_f) = p(\bar{c}_s|\epsilon) \cdot p(\epsilon)$$

$$p(\bar{\epsilon}, \bar{c}_s, c_f) = 0$$

$$p(\bar{\epsilon}, \bar{c}_s, \bar{c}_f) = p(\bar{c}_s|\bar{\epsilon}) \cdot p(\bar{\epsilon})$$

$$p(\bar{\epsilon}, c_s, c_f) = p(c_s|\bar{\epsilon}) \cdot p(\bar{\epsilon})$$

$$p(\bar{\epsilon}, c_s, \bar{c}_f) = 0$$

Now we derive $p(\epsilon_c)$, the probability of error $\epsilon$ in an error source after a single control c has been applied:

$$p(\varepsilon_c) = p(\varepsilon, \overline{c}_s, \overline{c}_f) + p(\overline{\varepsilon}, c_s, c_f) + p(\overline{\varepsilon}, \overline{c}_s, c_f) + p(\varepsilon, c_s, \overline{c}_f) \quad (22)$$

$$= p(\varepsilon, \overline{c}_s, \overline{c}_f) + p(\overline{\varepsilon}, c_s, c_f)$$

$$= p(\overline{c}_s \mid \varepsilon) \cdot p(\varepsilon) + p(c_s \mid \overline{\varepsilon}) \cdot p(\overline{\varepsilon})$$

$$= p(\varepsilon) \cdot (1 - p(c_s \mid \varepsilon)) + (1 - p(\varepsilon)) \cdot p(c_s \mid \overline{\varepsilon}).$$

If the control c is applied only to a fraction y of all the transactions coming out of the error source, Equation (22) is modified to:

$$p(\varepsilon_c) = y \cdot [p(\varepsilon) \cdot (1 - p(c_s \mid \varepsilon)) + (1 - p(\varepsilon)) \cdot p(c_s \mid \overline{\varepsilon})] + \quad (23)$$

$$(1 - y) \cdot p(\varepsilon)$$

$$= p(\varepsilon) \cdot (1 - yp(c_s \mid \varepsilon)) + (1 - p(\varepsilon)) \cdot (yp(c_s \mid \overline{\varepsilon})$$

Next, we consider $p(\epsilon_K)$, the probability of error $\epsilon$ after the application of a sequence of controls K to an error source, as shown on FIG. 3. Let $K=[c_j]|j=1\ldots J$, where $c_j$ is the j-th control in the sequence. Then, the probability of error after the application of the j-th control is:

$$p(\epsilon_{c,j}) = p(\epsilon_{c,j-1}) \cdot (1 - y_j p(c_{s,j} \mid \epsilon)) + (1 - p(\epsilon_{c,j-1})) \cdot (y_j p(c_{s,j} \mid \overline{\epsilon})) \quad (24)$$

where, the j subscript in the other variables denote the respective variables for the j-th control.

Equation (24) can be iteratively calculated to compute $p(\epsilon_C) = p(\epsilon_{c,J})$ starting at $p(\epsilon_{c,0}) = p(\epsilon)$. This quantifies the effect of applying a regime of controls K to a single error source. Using the error propagation formulation described above, we can now assess the impact of the controls on the error rates and cost of error at the audit targets in the business process. In auditing terminology, this level of analysis estimates the control risk in the accounting system.

The application of controls at an error source incurs a cost. We consider this cost to be linearly proportional to the number of transactions passing through the control. This cost consists of the cost to detect if an error exists and the cost to fix the error if found. Let $\omega(c_s)$ be the cost to monitor, detect and signal an error (incurred on all transactions passing through the control) and $\omega(c_f)$ be the cost of fixing each error (incurred only on the transactions deemed erroneous). Then, the cost per transaction passing through the control is:

$$\omega(c) = \omega(c_s) + \omega(c_f) \cdot (p(c_f, c_s, \overline{\epsilon}) + p(c_f, c_s, \epsilon) + p(c_f, \overline{c}_s, \epsilon) + p(c_f, \overline{c}_s, \epsilon))$$

Applying the assumptions for feed-forward controls and Equation (21), $$\omega(c) = \omega(c_s) + \omega(c_f) \cdot (p(c_s \mid \overline{\epsilon}) \cdot (1 - p(\epsilon)) + p(c_s \mid \epsilon) \cdot p(\epsilon)) \quad (25)$$

Considering $T_E$ error sources and a sequence of controls $K_i$ at an error source $t_i \epsilon T_E$, we have the total cost of controls in the business process:

$$\Omega_C = \sum_{t_i \in T_E} \left( V_i \sum_{c_j \in K_i} y_j \omega(c_j) \right) \quad (26)$$

where $V_i$, as defined in Equation (8), is the volume of transactions reaching the error source $t_i$.

Now we are in a position to formulate optimization problems that trade off the cost of controls at the error sources with the cost of error at the audit targets. This is done in the next section.

Optimization

The business process and control models developed above allow us to formulate the following series of optimization problems.

For these formulations, we use the following variables:
The overall system reliability (1−R) across all the audit targets, where R is either $$\sum_{t_j \in T_A} R1_j$$

as defined by Equation (14) or $$\sum_{t_j \in T_A} R2_j$$

as defined by Equation (15).
The total cost of error across all audit targets, $\Omega$ as given in Equation (18).
The total cost of controls in the business process, $\Omega_C$ as given in Equation (26).
The decision variables $y_j$, which is the fraction of transactions at error source $t_i \epsilon T_E$ that will be sent to a control $c_j \epsilon K_i$, where $K_i$ is the sequence of controls available for the error source $t_i$.

Using the above notation, the optimization formulations are as follows:
1. Maximize the system reliability (1−R), subject to a budget $\hat{\Omega}_C$ for the total control cost in the business process, i.e., $\Omega_C \leq \hat{\Omega}_C$.
2. Minimize the control cost $\Omega_C$, subject to a target system reliability (1−$\hat{R}$), i.e., $R \leq \hat{R}$.
3. Minimize the cost of error $\Omega$, subject to a budget $\hat{\Omega}_C$ for the total control cost in the business process, i.e., $\Omega_C \leq \hat{\Omega}_C$.
4. Minimize the control cost $\Omega_C$, subject to a budget $\hat{\Omega}$ for the total cost of error in the business process, i.e., $\Omega \leq \hat{\Omega}$.
5. Minimize the total cost in the process ($\Omega + \Omega_C$).

As a special case with a tractable solution, consider the optimization problem 4 above, where the cost of control must be minimized to as to keep the cost of error in the system below a threshold budget $\hat{\Omega}$.

We solve this problem by dividing it into two sub-problems. One sub-problem is at the audit targets stage, where we wish to minimize the total cost of error, given sets of controlled error levels and their corresponding control cost for each error source. The second sub-problem is to come up with these sets at the error sources stage, where we wish to minimize the control cost for a given error level.

For the audit target stage sub-problem, Equation (18) calculates the total cost of error across all audit targets $\Omega$, which can be written as follows, if we consider only a single class of error in our analysis:

$$\Omega = \sum_{t_j \in T_A} \left( \sum_{t_i \in T_E} V_i \cdot P_{ij} (\omega_1 + \omega_2 e_i^\epsilon) \cdot p_i(\varepsilon) \right) \quad (27)$$

To meet the $\Omega \leq \hat{\Omega}$ requirement, we need to apply controls at one or more error sources to reduce the "posterior" error rates $p(\epsilon_K)$ at some cost. For each error source $t_i$, we characterize a set of pairs: $\{(\omega_{i,k_i}, p_i(\epsilon_{k_i}))|k_i \in \{1,2,\ldots K_i\}\}$, where $\Omega_{i,k}$ is the cost of reducing the error level at $t_i$ to $p_i \epsilon \epsilon_{k_i}$. As described below for the second sub-problem, where we optimize the cost of controls at the error sources stage, $k_i$, is a control strategy that can be applied at the error source $t_i$. Table 2 below shows the different levels controls and the associated cost and reliability levels.

TABLE 2

The different error levels (by applying controls) and associated cost of control

| error source 1 | error source 2 | error source 3 | |
|---|---|---|---|
| $(\omega_{1,1}, p_1(\varepsilon_1))$ | $(\omega_{2,1}, p_2(\varepsilon_1))$ | $(\omega_{3,1}, p_3(\varepsilon_1))$ | |
| $(\omega_{1,2}, p_1(\varepsilon_2))$ | $(\omega_{2,2}, p_2(\varepsilon_2))$ | $(\omega_{3,2}, p_3(\varepsilon_2))$ | $\ldots, \ldots$ |
| $\vdots$ | $\vdots$ | $\vdots$ | |
| $(\omega_{1,K1}, p_1(\varepsilon_{K1}))$ | $(\omega_{2,K2}, p_2(\varepsilon_{K2}))$ | $(\omega_{3,K3}, p_3(\varepsilon_{K3}))$ | |

| error source I |
|---|
| $(\omega_{I,1}, p_I(\varepsilon_1))$ |
| $(\omega_{I,1}, p_I(\varepsilon_1))$ |
| $\vdots$ |
| $(\omega_{I,K1}, p_I(\varepsilon_{KI}))$ |

The objective here is to pick an appropriate level of control at each error source so as to keep the system level cost of error below the threshold budget $\hat{\Omega}$. This can be written as follows:

$$\min \sum_{t_i \in T_E} \sum_{k_i=1}^{K_i} (\omega_{i,k_i} \cdot z_{i,k_i}) \quad (28)$$

s.t.

$$\Omega = \sum_{t_i \in T_A} \left( \sum_{t_i \in T_E} V_i \cdot P_{ij}(\omega_1 + \omega_2 e_i^{\varepsilon}) \cdot \left( \sum_{k_i=1}^{K_i} z_{i,k_i} \cdot p_i(\varepsilon_{k_i}) \right) \right) \leq \hat{\Omega}$$

$$\sum_{k_i=1}^{K_i} z_{i,k_i} \leq 1,$$

$$z_{i,k_i} = \begin{cases} 1, & \text{if control level } k_i \text{ is chosen for error source } i \\ 0, & \text{if control level } k_i \text{ is not chosen for error source } i \end{cases}$$

The decision variable is $z_{i,k_i}$, $k_i \in \{1,2,\ldots K_i\}$. $z_{i,k_i}$ is a binary variable, which takes the value of 1 if the pair $(\omega_{i,k_i}, p_i(\epsilon_{k_i}))$ is chosen for the error source i. The constraint $$\sum_{k_i=1}^{K_i} z_{i,k_i} \leq 1,$$

implies that only one reliability level for each error source i can be chosen. Recognizing this problem as the multiple choice knapsack problem (see, for example, S. Martello and P. Toth, *Knapsack Problems, Algorithms and Computer Implementations*, John Wiley and Sons Ltd., England, 1990) which can be solved by dynamic programming in O(K×W) where K is the total number of levels across all error sources and W is related to the accuracy with which $\hat{\Omega}$ needs to be achieved.

Next, we develop a control model to compute the minimum cost control strategy for each level at each error source.

Although this implies the need to solve an optimization model to compute each (cost, error level) pair, we will show that this optimization model is a knapsack problem which is relatively easy to solve.

For the sub-problem at the level of the error sources, our objective is to come up with a set of $(\omega_{i,k_i}, p_i(\epsilon_k))$ pairs for each error source. In doing so, we wish to minimize the cost $\omega_{i,k_i}$ of reducing the error level at error source $t_i$ to $p_i(\epsilon_{k_i})$.

Equation (24) provides the means for iteratively calculating $p_i(\epsilon_{k_i})$ for a given set of controls $K_i$ at error source $t_i$ and a control strategy defined by the fraction of transactions $y_j$, $j \in \{1,2,\ldots,|K_i|\}$, reaching each control $c_j \epsilon K_i$. If we can reasonably assume that a control attempting to fix a non-error will not introduce an error, i.e., the states 5 and 7 in Table 1, $E_c = \bar{\epsilon}$. With this the error incidence rate $p(\epsilon_K)$ simplifies to:

$$p(\varepsilon_{K_i}) = p(\varepsilon) \cdot \sum_{j=1}^{|K_i|} (1 - y_j p(c_{s,j} | \varepsilon)). \quad (29)$$

$$\ln p(\varepsilon_{K_i}) = \ln p(\varepsilon) + \sum_{j=1}^{|K_i|} \ln(1 - y_j p(c_{s,j} | \varepsilon))$$

Observe that we have linearized the expression for $p(\epsilon E_{K_i})$ using logarithms. This suggests that the sequence in which the controls $c_j \epsilon K_i$ are applied is inconsequential. So a simple optimization formulation for a single error source with multiple controls is as follows: Given $c_j \epsilon K_i$ control units and a the target error level $p(\epsilon_{k_i})$, find the optimal control strategy $k_i$, specified in terms of $y_j$, $j \in \{1,2,\ldots,|K_i|\}$, that minimizes the control cost:

$$\min \sum_{j=1}^{|K|} (\omega(c_j) \cdot y_j) \quad (30)$$

s.t. $\ln p(\varepsilon) + \sum_{j=1}^{|K_i|} \ln(1 - y_j p(c_{s,j} | \varepsilon)) \leq \ln p(\varepsilon_{k_i})$ $y_j \in [0, 1]$ where $\omega(c_j)$ is the per-transaction cost of applying the jth control to the error source as defined in Equation (25). Although we have assumed (implicitly by making $y_j$ binary,) that the controls are applied to all the transactions or none, this can be easily relaxed to allow the control of a fraction of the transactions. Notice that the above problem is a knapsack problem that can be solved by dynamic programming (see, again, Martello and Toth 1990, supra) in O(J×R) where J is the number of controls and R is a number based on the accuracy desired of $p(\epsilon_{k_i})$.

Noting from Equation (29) that the sequence of applying controls does not impact the probability of error after the application of controls, we construct a simple algorithm that can find the optimal control strategy $k_i$ for a given target error level $p(\epsilon_{k_i})$. This is shown in Table 3. We select the control with the highest cost-effectiveness ratio and apply it to all the transactions in the error source. If the resulting error level is still higher than the target, we apply the control with the next highest cost-effectiveness ratio. When the error level falls below the target, we adjust the sampling fraction $y_j$ of the last selected to so as to achieve the target error level.

Thus, the sampling fractions of all controls will be 1 or 0 with the exception of one control, whose sampling fraction will be in [0-1].

TABLE 3

Algorithm for Control Strategy Selection

Given target error level, $p(\epsilon_{k_i})$
Candidate control set $K = \{C_1, C_2, \ldots C_J\}$,
Solution set $[y_j] | j \in \{1, 2, \ldots, |K|\} = [0]$
Set $P = p(\epsilon)$
1. Calculate the cost-effectiveness ratio, $\dfrac{p(c_{s,j} | \varepsilon)}{\omega(c_j)}$,
  for each candidate control unit in K
2. Choose the control that has the highest value $$j^* = \max_{c_j \in K}\left(\frac{p(c_{s,j} | \varepsilon)}{\omega(c_j)}\right)$$

3. Update $P = P \cdot (1 - p(c_{s,j^*} | \epsilon))$
4. if $P > p(\epsilon_{k_i})$,
  set $y_{j^*} = 1$;
  take $C_{j^*}$ off the candidate list K,
  if $K \neq \phi$ go to step 2
  else terminate the procedure with failure
else set $y_{j^*} = \dfrac{P - p(\varepsilon_{k_i})(1 - p(c_{s,j^*} | \varepsilon))}{P \cdot p(c_{s,j^*} | \varepsilon)}$ terminate the procedure with success We have described a framework for the quantitative modeling of data quality in a business process. We have shown how the model can be used to make assessments of data quality in a pre-defined process as well as to develop optimal control system designs that meet reliability or cost requirements.

These techniques will be of value to business process owners as well as to evaluators of data quality (such as auditors in case of business processes with financial transactions and accounts). However, the users of these techniques must adopt a methodology by which the data quality model must be developed and maintained. The methodology comprises of the following steps:
1. Create a model of an existing business process. Various modeling tools are commercially available for this purpose.
2. Utilizing the modeling framework developed in the Process Model section, identify the transaction sources, error sources, and audit targets.
   2.1. For transaction sources, obtain or estimate the volume of transactions over a given time period (e.g., per day, month, quarter, or etc.) and estimate the transaction book values. This may be a simple average book value or a probability distribution based on historical transaction data.
   2.2. For error sources, obtain the probability of errors prior to the application of any controls. This may be obtained from the logs of controls that already exist. For a new business process or for error sources that do not have logs of past control activity, an estimation must be done based on comparable error sources with available data. The taint of the error sources must also be obtained from historical logs or otherwise estimated. Note that the taint may be a point estimate or a probability distribution.
   2.3. For audit targets, specify the types of errors of interest and if any error level requirements exist for them.
3. Run the error propagation analysis described in the Process Model section to estimate error rates and cost of error at the audit targets. For a model with probability distributions, a Monte Carlo simulation can be performed to estimate error rates and costs in terms of probability distributions. The process analyst may develop multiple scenarios to test different expectations of future process changes, such as changes in transaction volumes and business process topology and policies.
4. Utilize the control systems model developed in the Control Model section to associate error sources with a set of controls. These may be existing or available controls. For each control, estimate its error detection and correction effectiveness, as defined by the probabilities $p(c_s | \epsilon)$ and $p(c_s | \bar{\epsilon})$. This data is available if the controls are periodically subject to internal or external auditing, where they are evaluated with test data with known errors. The cost of controls can be estimated from the time spent on each control to search for and then fix errors.
5. Analyze the impact of selected controls using the assessment technique described in the Control Model section. The process analyst may run multiple scenarios with different control selections as well as the scenarios developed in step 3 above. The cost of the selected controls can be compared with the reliability level or cost of error at the audit targets.
6. When manual search for the optimal control design is intractable, the optimization techniques shown in step 5 are applicable. Here, we assume that each error source has a set of potential controls and the problem is to select the fraction of the total transactions to send to each.

Although our model and analyses have been motivated by the types of transaction errors and error correction controls in the accounting and auditing domain, it can extend to other domains and definitions of data quality. For example, we can consider that "error" sources introduce uncertainty about the data in a transaction rather than mistakes. Sources of uncertainty could be prices of raw material, customer demand, product development times, service delivery times, etc. We can adapt the error propagation techniques of this invention to propagate these uncertainties to the data repositories. We can also then consider the analogues of "controls" that may reduce these uncertainties, but at a cost. For example, uncertainties about raw material prices can be reduced by establishing long-term contracts or hedging with options. Variability in delivery times may be reduced by automating processes. These uncertainty reduction actions come at a cost and we can trade off these costs with the consequent level or cost of the uncertainty in the data repositories.

In conclusion, our invention contributes to the analysis of data quality by incorporating a business process framework for the assessment and optimization of data quality. This invention applies not only to the literature and practice of financial accounting and auditing, but also to business decision-support systems.

While the invention has been described in terms of a single preferred embodiment, those skilled in the art will recognize that the invention can be practiced with modification within the spirit and scope of the appended claims.

The invention claimed is:

1. A method of managing data quality with an information processing system, comprising
   creating a model of a new or existing business process on a computer, the model representing data whose quality is to be managed using the information processing system;
   extending the model to assign tasks within the business process to attributes that model data quality for the data whose quality is to be managed, comprising
     assigning tasks characterized by a volume of transactions over a predefined time period and a random variable for each transaction signifying a quantitative value of the transaction a data quality attribute of transaction source, assigning tasks that operate on incoming transactions and are able to produce errors in them a data quality attribute of error source, any particular transaction error being one of the group comprising valuation error, existence error, and completeness error, and assigning repositories in the business process where transactions can be stored and retrieved a data quality attribute of audit target;

identifying an anticipated change in a business environment served by the model;

running by the computer error propagation analysis of said anticipated change on said error source tasks operating on said transaction source tasks to estimate error rates and cost of error at the audit targets for the data whose quality is to be managed;

utilizing a control systems model on the computer to associate said error sources with a set of controls;

analyzing by the computer an impact of selected controls of said set of controls responsive to said anticipated change, wherein said selected controls are applied to reduce error rates and cost of error at the audit targets for the data whose quality is to be managed;

optimizing by the computer a selection of controls for the data whose quality is to be managed, using an assessment technique that compares a cost of applying said selected controls with said cost of error at the audit targets, wherein said optimizing includes programming the computer to use the algorithm $$p(\varepsilon_{K_i}) = p(\varepsilon) \cdot \sum_{j=1}^{|K_i|} (1 - y_j p(c_{s,j} \mid \varepsilon)).$$

-continued $$\ln p(\varepsilon_{K_i}) = \ln p(\varepsilon) + \sum_{j=1}^{|K_i|} \ln(1 - y_j p(c_{s,j} \mid \varepsilon))$$

where $p(\epsilon_{k_i})$ is an optimal control strategy $k_i$, for a given target error level, $p(\epsilon)$ is an error incidence probability of error $\epsilon$, $K_i$, is the sequence of controls available for the error source $t_i$, where a control strategy is defined by a fraction of transactions $y_j, j \in \{1,2,\ldots,|K_i|\}$, reaching each control $c_j \in K_i$; and applying said selection of controls optimized in said optimizing step to at least some of said tasks within the business process in said information processing system that operate on incoming transactions and are able to produce errors in them.

2. The method of claim 1, further comprising identifying transaction sources of obtaining or estimating a volume of transactions over a given time period and estimating transaction book values, wherein said anticipated change is a change in said volume of transactions for an identified transaction source.

3. The method of claim 2, wherein said estimating transaction book values is configured to estimate based on a simple average book value or a probability distribution based on historical transaction data.

4. The method of claim 1, further comprising identifying error sources of obtaining a probability of errors prior to application of any controls and a taint of the error sources.

5. The method of claim 1 further comprising the step of providing a dashboard of key performance indicators.

* * * * *